Fig. 3.

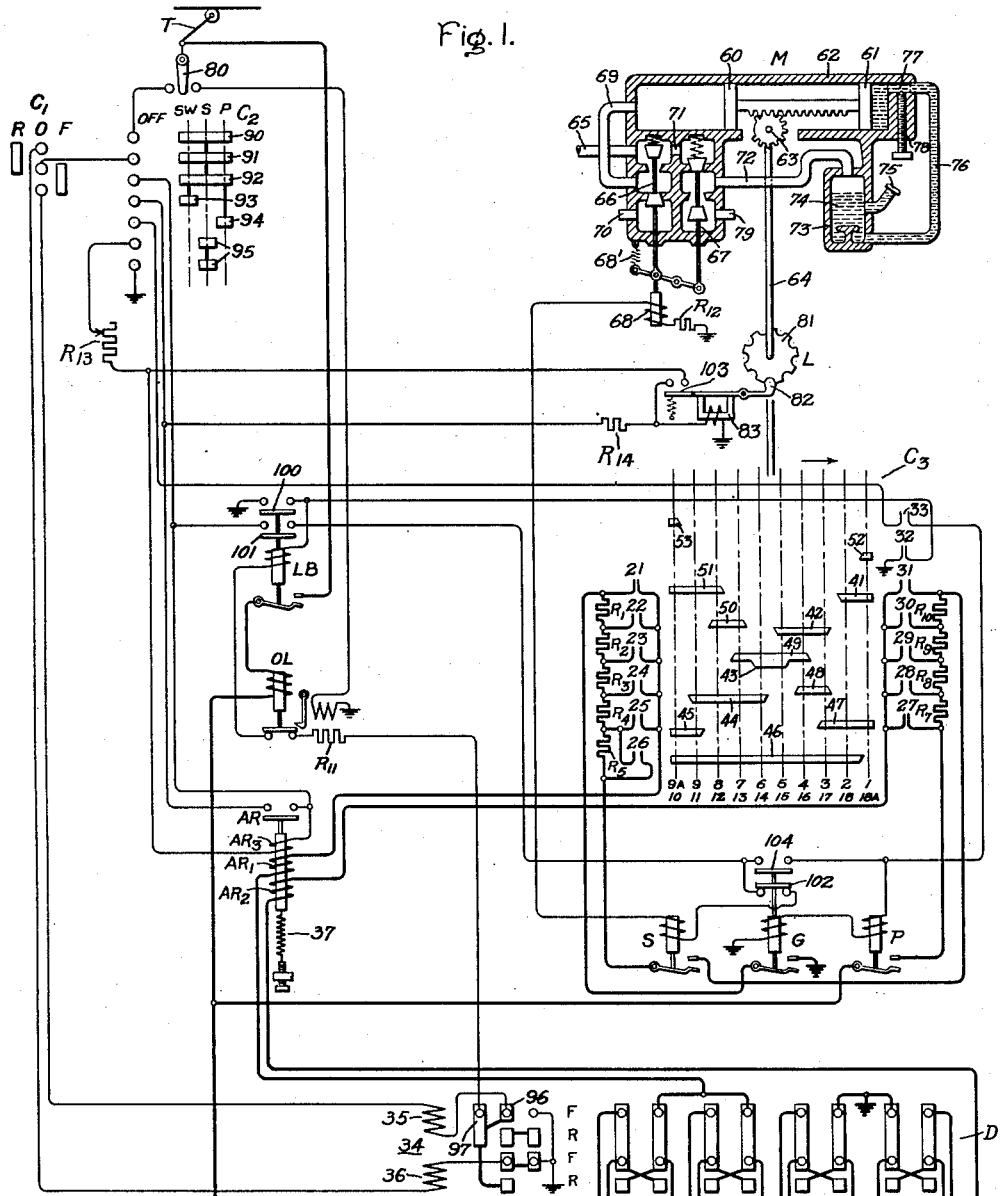

| POINT | \* SEQUENCE OF CONTACTOR CLOSING \* | | | | | | | | | | | | | | |
|---|---|---|---|---|---|---|---|---|---|---|---|---|---|---|---|
|  | LB | S | P | G | 21 | 22 | 23 | 24 | 25 | 26 | 27 | 28 | 29 | 30 | 31 |
| OFF |  |  |  | ● |  |  |  |  |  |  | ● |  |  |  |  |
| 1 | ● | ● |  | ● |  |  |  |  |  |  | ● |  |  |  |  |
| 2 | ● | ● |  | ● |  |  |  |  |  | ● | ● |  |  |  |  |
| 3 | ● | ● |  |  |  |  | ● |  |  | ● | ● | ● |  |  |  |
| 4 | ● | ● |  |  |  |  | ● |  |  | ● |  | ● | ● |  |  |
| 5 | ● | ● |  |  |  |  | ● | ● |  | ● |  | ● |  |  |  |
| 6 | ● | ● |  |  |  |  |  | ● | ● | ● |  | ● |  |  |  |
| 7 | ● | ● |  |  |  |  |  |  | ● |  | ● |  | ● | ● |  |
| 8 | ● | ● |  |  |  |  |  |  | ● |  | ● |  |  | ● | ● |
| 9 | ● | ● |  |  |  |  |  |  | ● | ● | ● |  |  |  | ● |
| 9-A | ● | ● |  |  |  |  |  |  |  | ● | ● |  |  |  | ● |
| TRANS | ● | ● | ● | ● |  |  |  |  |  | ● | ● |  |  |  | ● |
| 10 | ● |  | ● | ● |  |  |  |  |  | ● | ● |  |  |  | ● |
| 11 | ● |  | ● | ● |  |  |  | ● | ● | ● |  |  |  |  | ● |
| 12 | ● |  | ● | ● |  |  |  | ● |  | ● |  |  |  | ● | ● |
| 13 | ● |  | ● | ● |  |  |  | ● |  | ● |  |  | ● | ● |  |
| 14 | ● |  | ● | ● |  |  | ● | ● |  | ● |  | ● |  |  |  |
| 15 | ● |  | ● | ● |  | ● | ● |  |  | ● |  | ● |  |  |  |
| 16 | ● |  | ● | ● |  | ● |  |  |  | ● |  | ● | ● |  |  |
| 17 | ● |  | ● | ● |  | ● |  |  |  |  | ● | ● | ● |  |  |
| 18 | ● |  | ● | ● | ● |  |  |  |  |  | ● | ● |  |  |  |
| 18-A | ● |  | ● | ● | ● |  |  |  |  |  |  | ● |  |  |  |

Inventor:
John F. Tritle,
by Charles E. Jullar
His Attorney.

UNITED STATES PATENT OFFICE 2,041,580

SYSTEM AND APPARATUS FOR MOTOR CONTROL

John F. Tritle, Erie, Pa., assignor to General Electric Company, a corporation of New York Application August 21, 1931, Serial No. 558,533

21 Claims. (Cl. 172—179)

My invention relates to the control of electric motors, particularly to series parallel acceleration control of railway motors, and it provides improvements upon the system and apparatus for motor control described and claimed in my Patent No. 1,434,758 of November 7, 1922.

In the control arrangement of my patent, the motor accelerating switch mechanism is operated in one direction through a series of positions to accelerate the motors connected in series relation and in the reverse direction through the same series of positions to accelerate the motors connected in parallel relation.

One object of the present invention is to provide an improved fluid pressure operating means for such a motor accelerating switch mechanism or controller.

A further object is to provide improved means for stopping the operation of the motor accelerating switch mechanism at any one of the series of positions.

Another object of the invention is to provide a control for the motor and the accelerating switch operating mechanism such that the acceleration of the motor is controlled jointly as a function of time and the motor accelerating current.

A still further object is to provide for varying the relative action of the motor accelerating current control and the time control so that different rates of motor acceleration may be obtained.

To obtain the timed control of the motor accelerating switch mechanism in accordance with the present invention, a fluid pressure reciprocating operating device is employed and provided with an incompressible liquid throttle device for retarding operation thereof. An adjustable orifice through which the incompressible liquid flows permits the retarding effect to be varied as desired to meet the operating conditions.

A mechanical stop mechanism is associated with the fluid pressure operating device for arresting the timed operation thereof in any one of the series of operating positions under the control of the operator. This stop mechanism also is arranged to be controlled automatically by an acceleration relay responsive to the motor current in such a manner that the timed operation of the motor accelerating switch mechanism is stopped automatically whenever the motor accelerating current exceeds a predetermined value. In this way the acceleration of the motor is controlled in accordance with the motor current.

Remotely controlled means are provided convenient to the operator for adjusting the responsiveness of the accelerating relay to the motor current and thereby permit different rates of acceleration of the motors to be obtained as desired. The various switches employed for establishing the series parallel connections of the motors and also the control valve mechanism for the fluid pressure operated device are preferably arranged to be operated by electromagnets energized selectively by means of a master controller.

Fig. 1 of the accompanying drawing illustrates schematically a series parallel motor acceleration control system embodying a preferred form of the invention, Fig. 2 is a simplified diagram of the main motor circuits and control switches of the system shown in Fig. 1 and Fig. 3 is a chart showing the sequence of operation of the several circuit controlling switches and contacts.

In Fig. 1, the electric motors, comprising armatures $A_1$ to $A_4$ and field windings $F_1$ to $F_4$, are shown as of the ordinary series type used in railway service. The motors are controlled by the electro-responsive series parallel switches S, G, P and the acceleration controller $C_3$, which latter is shown schematically as of the cam actuated type connected to be operated by the reciprocating fluid pressure operating device M. Power is supplied to the motors through a circuit extending from the trolley T to the ground connections indicated in the drawings and including the accelerating resistors $R_1$ to $R_5$ and $R_7$ to $R_{10}$. A motor reversing switch mechanism 34 of the well known electrically controlled pneumatically operated type is employed for reversing the motor field connections.

The electromagnetically operated line breaker LB and the electromagnetic overload relay OL are included in the motor circuit for operation in conjunction with the other apparatus just described under the control of the master controllers $C_1$ and $C_2$. An accelerating relay AR having the two motor current responsive windings $AR_1$ and $AR_2$ is also provided with a winding $AR_3$ for controlling the responsiveness thereof in the manner which will be more fully described hereinafter.

The acceleration controller $C_3$ is illustrated diagrammatially as of the cam operated type having the switch contacts 21 to 33 arranged to be operated respectively by the cams 41 to 53. The cam switches 21 to 31 control the short circuiting of the accelerating resistors $R_1$ to $R_5$ and $R_7$ to $R_{10}$ respectively.

The fluid pressure operating mechanism M, as shown, is of the type having the opposing pistons 60 and 61 reciprocating in the cylinder casing 62 and connected through the rack and pinion gearing 63 to rotate the shaft 64, which is connected to rotate the cams 41 to 53 of the accelerating controller $C_3$. The operating fluid pressure is supplied from a suitable reservoir, not shown, through the supply pipe 65 and is controlled by the double-acting valves 66 and 67 which are interconnected so as to be operated by the single electromagnet 68. The valves are biased to the position in which they are shown by suitable means such as spring 68'. This insures that when the magnet 68 is deenergized, the fluid pressure is admitted directly from the pipe 65 through the conduit 69 to the piston 60 so as to operate the cams of controllers $C_3$ to their respective off positions in which they are shown diagrammatically in the drawings.

When the electromagnet 68 is energized, the positions of the valves 66 and 67 are reversed and the fluid pressure on piston 60 is exhausted to atmosphere through the lower port of valve 66 and the exhaust pipe 70 and fluid pressure is admitted through the opening 71 and the upper port of valve 67 to the conduit 72 which communicates with the top of the chamber 73. The chamber 73 is filled with a non-compressible fluid 74 through the filling opening 75. While any suitable fluid may be employed, preferably a non-freezing fluid, such as glycerine and alcohol or other similar mixture, is used. The non-compressible fluid is forced by the fluid pressure exerted thereon through the conduit 76 and the restricted orifice 77 to operate the piston 61. The adjustable needle valve 78 is provided to vary the size of the orifice 77 and thereby regulate the rate of flow of the incompressible liquid therethrough. In this way the operation of piston 61 is retarded to a desired degree whenever the liquid is forced through the orifice from the container 73 to the piston or from the piston to the container.

A stop or locking mechanism L is provided for arresting the retarded operation of the acceleration controller $C_3$ by the fluid pressure operating mechanism in any one of the series of positions 1 to 9A or 10 to 18A. As shown schematically in the drawings, this locking mechanism comprises the notched wheel 81 and the cooperating pivoted locking pawl 82 for engaging with the notches in the wheel 81. The arrangement is such that unless the pawl 82 is held by the locking electromagnet 83 in engagement with the notches in the wheel 81, the pawl will be forced out of the notches due to the torque exerted upon the wheel by the fluid pressure operating mechanism M. The electromagnet 83 is arranged to hold the pawl 82 firmly in engagement with the notches in the wheel 81 whenever the electromagnet is sufficiently energized and in this way arrest further movement of the controller $C_3$ by the torque of the mechanism M.

The main motor circuits (shown in the simplified diagram of Fig. 2) are substantially the same as disclosed and claimed in my previously mentioned patent No. 1,434,758 so as to permit movement of the acceleration controller $C_3$ in one direction through its series of accelerating positions to exclude the accelerating resistor sections from the circuit with the motors in series relation and in the opposite direction through its series of positions to exclude the resistor sections from the circuit with the motors connected in parallel relation. Thus upon tracing the circuits in Fig. 2 it will be seen that for series acceleration, the motor circuit extends from the supply source T through the line breaker LB, the overload relay OL, and the pair of motor armatures $A_1$ and $A_2$ and fields $F_1$ and $F_2$ in parallel relation, the winding $AR_1$ of the accelerating relay, the switch 21, and thence through the resistors $R_1$ to $R_5$, the switch S, resistor sections $R_{10}$ to $R_7$, the switch 27, the winding $AR_2$ of the accelerating relay, the pair of motor armatures $A_3$ and $A_4$ and fields $F_3$ and $F_4$ in parallel to ground. The cam arrangement of the accelerating switch is such that the resistance control switches 21 to 31 are closed in the sequence indicated in the sequence on the chart of Fig. 3 corresponding to positions 1 to 9A until all sections of the resistors are excluded from the circuit by the final closure of switches 25, 26 and 31. It should here be observed that the relay windings $AR_1$ and $AR_2$ are wound cumulatively and therefore add their attractive efforts in a direction to close the contact of the accelerating relay AR. For series operation the series motor current flows through each of the windings $AR_1$ and $AR_2$.

To continue acceleration of the motors with the parallel connection, the electromagnet switches G and P are closed thus connecting the resistors $R_1$ to $R_4$ in parallel with the motors $A_3$ and $A_4$ and the resistors $R_{10}$ and $R_7$ in parallel with the motors $A_1$ and $A_2$. Upon the subsequent opening of switch S, the motors $A_1$ and $A_2$ with the resistors $R_1$ and $R_4$ in series therewith are connected in parallel circuit relation with the motors $A_3$ and $A_4$ with the resistors $R_7$ and $R_{10}$ in series relation with the latter. Thereupon the return movement of the controller $C_3$ through the series of operative positions effects operation of the resistance controlling switches in the sequence indicated in the chart of Fig. 3 corresponding to positions 10 to 18A to exclude the resistor sections from the circuit, thus leaving the motors in full parallel operating relation. The relay windings $AR_1$ and $AR_2$ for parallel operation again add their attractive efforts. As the chart of Fig. 3 indicates, however, first resistance in one parallel path is short circuited and is followed by the short circuiting of resistance in the other parallel path. The resulting differences in motor current between the two paths are immediately reflected in the attractive effort applied to the accelerating relay. However, it will be seen that the relay is always responsive to the arithmetical sum of the motor currents flowing in each branch of the parallel circuit.

The manner in which the control system of Fig. 1 operates to accomplish the above outlined series parallel acceleration of the motors is as follows. To initiate acceleration of the motors in the forward direction, the control switch 80 is moved to the left, the reverse master controller $C_1$ is moved to the right into its forward position, and the master controller $C_2$ is moved either to series accelerating position S or the parallel accelerating position P as desired.

Assuming controller $C_2$ is moved into position S, the control winding 35 of the reverser 34 is energized to effect operation of the reverser to the forward position. The energizing circuit for the winding 35 extends from trolley T through switch 80, contacts 90 and 91 of master controller $C_2$, the forward contact F of controller $C_1$, winding 35, contacts 96 and 97 on the reverser, a safety resistor $R_{11}$, the contact of the overload relay, the operating winding of the line breaker LB and to ground through contacts 32 of the acceleration controller $C_3$, which latter are closed by the cam 52 with the controller in its initial position 1.

Upon the resulting closure of the line breaker LB, the auxiliary contact 100 associated therewith establishes a holding circuit to ground independent of the contacts 32. At the same time the line breaker auxiliary contact 101 closes a circuit extending from the contact 92 of controller C2 through the contact 101 in its closed position, the normally closed auxiliary contact 102 of the ground contactor G, the operating winding of the series contactor S, the winding of the valve operating electromagnet 68 and resistor $R_{12}$ to ground. The resulting closure of the series contactor S establishes the series connection of the motor, as described above in connection with Fig. 2, due to the fact that the cam switches 21 and 27 of the accelerating controller C are closed with the controller in its initial position.

Upon energization of the valve magnet 68, as above described the positions of the fluid pressure controlling valves 66 and 67 are reversed thereby causing the liquid 74 to be forced against piston 61 to effect retarded operation thereof to rotate the cam shaft 64 in the manner previously noted. The needle valve 78 preferably is so adjusted that the flow of the liquid through the orifice 77 is retarded sufficiently to insure the advancement of the controller C3 through its successive operating positions to exclude the accelerating resistors from the motor circuit at a rate corresponding to a desired rate of acceleration of the motors under light load or easy starting conditions. Thus with the accelerating resistor properly proportioned, the current in the winding $AR_1$ and $AR_2$ of the accelerating relay under these light load or easy motor starting conditions may be maintained below the value required to effect operation of the accelerating relay to control the motor acceleration. Consequently, under these light load or easy motor starting conditions, the motors are accelerated primarily as a function of time and at a fixed rate determined by the setting of the needle valve 78.

However, under ordinary starting conditions and particularly in starting up a grade or with an excessive load, the accelerating relay AR co-operates in controlling the rate of acceleration of the motor. In case a low rate of acceleration is desired, the master controller C2 is advanced to position S in order to bring about the acceleration of the motor to the full series position as previously described. With the controller C2 in position S, the calibrating winding $AR_3$ of the accelerating relay is normally energized through a circuit including the adjustable resistor $R_{13}$, the circuit extending from the trolley T through switch 80 in its left hand position, contact segments 90 and 92, the winding $AR_3$, the adjustable resistor $R_{13}$ and the contacts 95 to ground. This normal energization of the winding $AR_3$, however, is insufficient to produce operation of the accelerating relay to close its contact AR without a predetermined energization of the windings $AR_1$ and $AR_2$ by the motor accelerating current.

Upon the establishment of the series circuits for the motor and the subsequent operation of the controller M from its initial position in the manner previously described the stop or locking pawl 82 is moved out of the corresponding notch in the wheel 81 as the controller is advanced from each of its operative positions. When the locking pawl 82 is thus moved out of the notch, it also is operated out of intimate attractive relation with the holding electromagnet 83. Also at the same time the auxiliary contact 103 is closed. The closure of contact 103 connects the winding of the holding electromagnet 83 in parallel or multiple circuit with the adjustable resistor $R_{13}$. This multiple connection of the winding of locking electromagnet 83 and the adjustable resistor $R_{13}$ produces an increased energization of the calibrating winding $AR_3$ of the accelerating relay. This increased energization of the winding $AR_3$ acts cumulatively with the windings $AR_1$ and $AR_2$ which are energized in accordance with the motor accelerating current in a direction tending to actuate the accelerating relay contact to the closed position against the bias of the adjustable calibrating spring 37. Thus whenever the combined energization of all of the accelerating relay windings $AR_1$, $AR_2$, $AR_3$ is above a predetermined value as determined by the adjustment of spring 37, the contact of the accelerating relay is operated to the closed position. Upon the closure of the accelerating relay contact AR, the resistor $R_{14}$ is connected in parallel or multiple circuit with the winding $AR_3$ of the accelerating relay as long as the contact 103 remains closed and the stop or locking pawl 82 therefore remains out of one of the notches in the wheel 81. This parallel or multiple connection of the resistor $R_{14}$, immediately reduces the current in the winding $AR_3$ and at the same time increases the energization of the winding of the holding electromagnet 83. With the energization of the winding $AR_3$ reduced, the control of the dropout of the accelerating relay contact resides primarily with the windings $AR_1$ and $AR_2$ which are responsive to the motor accelerating current. More specifically the contact 103 operated by the stop mechanism effects an increase in the energization of the relay calibrating winding $AR_3$ only as the accelerating controller advances from one accelerating step to another. The resulting increased attractive effort applied by this relay winding $AR_3$ thereby renders the operation of the accelerating relay AR more sensitive to the changes in motor current.

In case the motor accelerating current is above a predetermined value as determined by the adjustment of spring 37, the contacts of the accelerating relay remain closed. Consequently the winding of the locking electromagnet 83 remains energized with the resistor $R_{14}$ in the energizing circuit. Thus when the locking pawl 82 enters the next adjacent notch in wheel 81 and is again in intimate attractive relation with the magnet 83, the pawl is firmly held in engagement with the notch. Under these conditions the holding electromagnet and pawl serve to arrest further advancement of the accelerating contactor cam shaft until the motors have accelerated sufficiently to reduce the current through the accelerating relay windings $AR_1$ and $AR_2$ below the predetermined value. Thereupon the accelerating relay opens its contact and the holding electromagnet 83 is deenergized thus permitting the further advancement of the cam shaft to continue.

Between the accelerating steps the pawl 82 is moved out of the notch in the wheel 81 to reclose the contact 103 and thereby again increase the energization of the winding $AR_3$ of the accelerating relay in the manner previously described. Thus at each step the accelerating relay is placed in condition to either remain closed and thereby continue the energization of the locking electromagnet 83 to stop further advancement of the accelerating cam shaft when the motor current is above a predetermined value or is dropped out upon the opening of contact 103 to permit the advancement of the cam shaft to continue when the motor accelerating current is below the predetermined value.

By varying the adjustment of the resistor $R_{13}$, the pickup and dropout values of current for the accelerating relay may be varied as desired. Thus when the value of resistor $R_{13}$ is increased, the normal energization of the winding $AR_3$ is decreased, thus requiring a higher value of motor accelerating current to maintain the accelerating relay in the closed position. Conversely when the resistor $R_{13}$ is decreased, the normal energization of the winding $AR_3$ is increased thereby decreasing the value of motor accelerating current required to maintain the accelerating relay in the closed position. In this way the advance of the cam shaft is effected under the joint timed control of the fluid pressure operating mechanism and the control of the accelerating relay in the manner just outlined, until all of the accelerating resistance is excluded from the motor circuits with the motors operating in full series relation.

To continue the motor acceleration in the parallel relation, the controller $C_2$ is operated to the parallel position P. This results in the energization of the parallel electromagnetic switches P and G through a circuit extending from the contact 94 of controller $C_2$ through the switch 33, which is closed by the cooperating cam 53 when the controller $C_2$ reaches the full series position 9A and thence through the operating windings of the switches P and G in series circuit to ground. Upon the resulting closure of switches P and G, the energizing circuit of the series contactor S and the magnet valve 68 is interrupted by the opening of the auxiliary contact 102 of contactor G. At the same time the auxiliary contact 104 is closed to establish a holding circuit for the contactors G and P extending from the contact 92 of master controller $C_2$ through contact 101 of the line breaker and independent of the contact 33 of controller $C_3$. Closure of contactors P and G serves to connect the motors in parallel relation with a section of the accelerating resistance in series with each motor in the manner previously described in connection with Fig. 2.

As soon as the valve electromagnet 68 is de-energized, the valves 66 and 67 are returned to their respective positions in which they are shown on the drawing by the spring 68'. This exhausts pressure from the liquid container 73 and at the same time admits pressure to the piston 60. Thereupon the operation of the cam shaft 64 in the reverse direction through its operative positions 10 to 18A is initiated with the flow of liquid through the restricted orifice 77 back into the container 73 regulating the rate of return movement.

With light load or easy starting conditions the accelerating relay may remain inactive during the parallel acceleration of the motors and the acceleration then is effected as a function of time in the same way as described in connection with the series acceleration of the motor. The accelerating relay however will function to energize the locking electromagnet 83 and hold the pawl 82 in engagement with one of the notches in the wheel 81 and thereby arrest movement of the cam shaft 64 whenever the motor current exceeds a predetermined value.

With the controller $C_2$ in the parallel position P, the normal energizing circuit through resistor $R_{13}$ for winding $AR_3$ of the accelerating relay is interrupted at contacts 95. By interrupting the normal energizing circuit of the calibrating winding $AR_3$ during the parallel acceleration of the motors, a higher motor current is obviously required to close the relay than during the series acceleration. The sensitiveness of the relay AR to changes in motor current is unaffected however. Thus, during the parallel acceleration of the motor, the winding $AR_3$ is energized in series with the magnet 83 only as the contact 103 of the locking pawl is closed between accelerating steps.

The return movement of the cam shaft during parallel acceleration of the motors serves to bring the cams of controller $C_3$ into engagement with the cooperating switches to close the same in the sequence indicated in points 10 to 18A of the sequence chart of Fig. 3. This excludes the resistance sections alternately from the circuit of the parallel connected motors until the motors are finally operating in full parallel relation.

As I have stated, one of the current windings, for example winding $AR_1$, will have greater excitation than the other current winding $AR_2$ whenever the resistance included in the corresponding motor circuit is less than in the other motor circuit. Referring to Figs. 2 and 3, it will be remembered that for the first parallel step, point 10 of Fig. 3, an equal amount of resistance is connected in each branch of the parallel circuit. For the next accelerating step, or point 11 of Fig. 3, the resistance $R_4$ in one parallel circuit is short circuited thereby permitting an increased accelerating current to flow through the motors $A_1$ and $A_2$ and the winding $AR_1$, which winding proportionately increases its attractive effort on the relay AR.

It will now be assumed that the spring 37 is adjusted so that a normal current of 200 amperes in each of the coils $AR_1$ and $AR_2$ is just insufficient to maintain the contacts of the relay closed. Therefore, the relay AR will open its contacts as soon as the arithmetical sum of the currents flowing in the respective motor circuits decreases to 400 amperes. It will, therefore, be seen that this relay will open its contacts even though the current through the motors $A_1$ and $A_2$ is above 200 amperes provided the current through the motors $A_3$ and $A_4$ is correspondingly reduced below 200 amperes or vice versa.

It will now be assumed that with a normal load current of 200 amperes, or 100 amperes per motor, flowing in each branch or path of the parallel circuit, the relay AR drops out to short circuit the resistance $R_4$. The motors $A_1$ and $A_2$ exert greater torque, due to the increase of their current to a predetermined maximum value, whereby the vehicle and the motors $A_1$ to $A_4$ inclusive are accelerated to a higher speed. As the speed increases the currents decrease, the current in the motors $A_1$ and $A_2$ decreasing from the maximum value above 200, while the current in the motors $A_3$ and $A_4$ decreases below the normal load current of 200 amperes. The motor currents, as reflected on the accelerating relay AR at the instant the resistance $R_4$ is short circuited, causes an increase of attractive effort by the winding $AR_1$ to a maximum value while the normal attractive effort, due to the 200 amperes or normal motor current, is applied by the winding $AR_2$ to the relay. The relay, therefore, immediately recloses and remains closed until the currents in its two windings have decreased to give the equivalent attractive force of 200 amperes in each winding, when the relay again drops to effect the next accelerating step. The acceleration of the vehicle continues in this manner, the relay first opening and then closing for each step.

It will be observed from the sequence chart Fig. 3 that in the next step, point 12, resistance $R_{10}$ is short circuited which gives a balanced current condition in the parallel circuit. In the next step, point 13, the resistance $R_9$ is short circuited giving an unbalanced current condition, the coil $AR_2$ in this case having the greater current. It will be observed that in the succeeding steps $R_3$ is short circuited in step 14 giving a balanced current condition, $R_2$ is short circuited in step 15 giving an unbalanced current condition, $R_8$ is short circuited in step 16 giving a balanced current condition, $R_7$ is short circuited in step 17 giving an unbalanced current condition, and the remaining resistance $R_1$ is short circuited in step 18 giving a balanced current condition.

The actuating relay in thus responding to the average current flow produces a uniform increase in tractive effort with unbalanced motor currents during parallel operation. A smooth acceleration without jerks is thereby effected.

If in starting the motors in series, a high rate of acceleration should be desired, the controller $C_2$ is advanced at once into position P. This prevents the normal energization of winding $AR_3$ of the accelerating relay through the adjustable resistor $R_{13}$ and contacts 95 in the manner previously described. Consequently, a higher value of motor current in windings $AR_1$ and $AR_2$ will be required to effect closure of the accelerating relay contacts. This results in a higher rate of series acceleration of the motors than where the winding $AR_3$ is normally energized through resistor $R_{13}$, and contacts 95 of controller $C_2$ in position S. When the controller $C_2$ is thus advanced directly into position P at starting, the series acceleration of the motors at the higher rate is followed immediately by the parallel acceleration, thus quickly bringing the motors to the maximum operating speed.

It will be noted that the cam shaft in the full parallel operating relation of the motors occupies the same position as it had at the beginning of the series acceleration. Consequently, in case the master controller $C_2$ is returned to the off position in order to stop the motors by opening the energizing circuit for the line breaker and the parallel contactors P and G, the entire equipment is at once ready to repeat the series parallel acceleration of the motors in the manner described above.

If at any time during either the series or parallel acceleration of the motors, the operator should for any reason desire to stop further advance of the accelerating cam shaft, this is accomplished by returning the controller $C_2$ to the holding position indicated as SW. In this position the contact 93 serves to energize the locking electromagnet 83 directly from the trolley supply and in this way electromagnetically hold the pawl 82 in engagement with one of the notches in the locking wheel 81. The pawl thus prevents further operation of the cam shaft by the operating mechanism M until the locking electromagnet 83 is deenergized by movement of the master controller $C_2$.

From the foregoing it will be seen that my present invention provides a timed acceleration motor control involving only a single electromagnet for operating the valves of the fluid pressure mechanism and that the electromagnetically operated stop mechanism enables both current limit and manual control of the timed acceleration of the fluid pressure operating mechanism to be obtained. Moreover, the acceleration of the motors under joint time and acceleration current control permits a very rapid rate of acceleration to be attained such as is required for the successful operation of street cars in present day traffic conditions. At the same time the operator's ability to vary the rate of automatic acceleration or to arrest the automatic operation of the acceleration controller at any point insures against too rapid acceleration of the motors when abnormal or adverse conditions are encountered.

What I claim as new and desire to secure by Letters Patent of the United States, is:

1. In combination, an acceleration controller operable through a series of definite positions, pneumatic operating means therefor, timing means associated therewith for retarding operation of said controller comprising a chamber having an incompressible fluid therein in communication through a restricted orifice with said pneumatic means, a mechanical stop mechanism for arresting at each of said definite positions the retarded operation of said controller by said operating means, and control means for rendering said stop mechanism effective and ineffective.

2. In combination, a circuit controller operable through a series of circuit controlling positions, a pneumatic operating device therefor, retarding means having an incompressible fluid throttling device associated therewith for effecting timed operation of said controller, a mechanical stop mechanism operable to arrest the retarded operation of said controller by said fluid pressure means at each of said series of positions, and automatic means responsive to predetermined electrical conditions of the circuit for controlling the operation of said stop mechanism.

3. In combination, a circuit controller operable each way through a series of circuit controlling positions, a pneumatic operating device therefor, retarding means having an incompressible fluid throttling device associated therewith for effecting timed operation of said circuit controller, a multi-position stop mechanism operable to arrest the retarded operation of said controller by said operating device at each of said series of positions, automatic means responsive to current in the circuit for controlling said stop mechanism, and means for controlling said stop mechanism independently of said current responsive means.

4. In combination, a motor controller operable in each direction through a series of positions, a reciprocating fluid pressure operating device therefor having opposing pistons, each for operating the switch mechanism in a corresponding direction, timing means comprising a chamber having an incompressible fluid therein in communication through a restricted orifice with one of said pistons, and a valve mechanism for admitting fluid pressure either to said chamber or to the other piston to effect timed operation of said controller in a corresponding direction.

5. In combination, a plurality of motors, a series parallel motor acceleration controller, connections whereby movement of said controller in one direction through a series of positions accelerates said motors in series and movement of said controller in the reverse direction through the same series of positions accelerates said motors in parallel, a reciprocating fluid pressure operating device therefor having opposing pistons, each for operating the switch mechanism in a corresponding direction, timing means comprising a chamber having an incompressible fluid therein in communication through a restricted orifice with one of said pistons, and electrically controlled valve mechanism for selectively admitting fluid pressure either to said chamber or to the other piston to effect timed operation of the controller in the corresponding direction.

6. In combination, a plurality of motors, a series parallel motor acceleration controller, connections whereby movement of said controller in one direction through a series of positions accelerates said motors in series, and movement of said controller in the reverse direction through the same series of positions accelerates said motors in parallel, a reciprocating fluid pressure operating device therefor having opposing pistons, each for operating the switch mechanism in a corresponding direction, timing means comprising a chamber having an incompressible fluid therein in communication through a restricted orifice with one of said pistons, electrically controlled valve mechanism for selectively admitting fluid pressure either to said chamber or to the other piston to effect timed operation of the controller in the corresponding direction, and electrically controlled stop mechanism operable to arrest the timed operation of the controller by said fluid pressure operating device at each of said series of positions.

7. In a motor control system the combination of a plurality of motors, a plurality of motor accelerating resistors, switch mechanism for connecting the motors and resistors in series and in parallel relation including a controller rotatable in one direction through a series of positions to exclude the resistors from the motor circuit during series acceleration thereof and operable in the reverse direction through the same series of positions to exclude the resistors from the motor circuit during the parallel acceleration, a reciprocating fluid pressure operating device therefor having opposing pistons each for operating the switch mechanism in a corresponding direction, timing means comprising a chamber having an incompressible fluid therein in communication through a restricted orifice with one of said pistons, electrically controlled valve mechanism for separately admitting fluid pressure to said chamber and to the other piston to effect timed operation of the accelerating controller in a corresponding direction, and electrically controlled stop mechanism for arresting the timed operation of the controller in each of said positions.

8. In a circuit control system a master controller having a plurality of circuit controlling positions, an electrically controlled motor accelerating controller operable through a series of regulating positions under the control of said master controller and having timing means for retarding operation thereof through said positions, stop mechanism for arresting the retarded operation of said switch mechanism, a relay responive to an electrical condition of the regulated circuit for controlling said stop mechanism, electrical means connected to be controlled by said master switch in a plurality of positions thereof for varying the responsiveness of said relay to said electrical condition, and connections through which the stop mechanism is operated under the control of the master switch controller independently of the control of said relay.

9. In a motor control system, a master controller selectively operable to a plurality of positions, a motor accelerating controller operable each way through a series of circuit controlling positions, a pneumatic operating means therefor operable under the control of said master controller and having an incompressible fluid throttling device associated therewith for retarding operation of said accelerating controller, stop mechanism for arresting the retarded operation of said accelerating controller in any one of said positions, a relay responsive to the motor current for controlling said stop mechanism, electrical means connected to be controlled by said master controller in a plurality of positions thereof for varying the responsiveness of said relay to the motor current, and connections through which said master controller effects operation of said stop mechanism upon a predetermined operation of the master controller independently of the control of said relay.

10. In combination, a plurality of motors, switching means for selectively connecting said motors in series or in parallel circuit relation, an accelerating controller for controlling the acceleration of said motors, an accelerating relay provided with a plurality of windings for controlling the operation of said acceleration controller, means for energizing said relay windings in response to the arithmetical sum of the currents in each parallel path during parallel operation comprising connections for connecting one of said windings in each of said parallel paths.

11. Means for controlling electric motors comprising a controller for the motor circuit, an operating device for advancing said controller step by step, an accelerating relay provided with a plurality of windings for controlling the operation of said controller, means for energizing said windings in response to the arithmetical sum of the currents through said motors during parallel operation comprising connections for connecting one of said windings in each parallel path during parallel operation.

12. Means for controlling electric motors connected in series or in parallel relation comprising a controller for the motor circuits, an operating device for advancing said controller step by step, an accelerating relay provided with a plurality of windings for controlling the operation of said controller, means for energizing said windings in response to the arithmetical sum of the currents through said motors during parallel operation comprising connections for connecting one of said windings in each parallel path during parallel operation, and means for energizing another of said windings in greater degree during series operation than during parallel operation of the motors.

13. In combination with an electric motor and an accelerating controller therefor operable through a plurality of circuit controlling positions, stop mechanism for mechanically holding said accelerating controller in one of its circuit controlling positions, an accelerating relay, means responsive to motor current for operating said relay, and means operated by said stop mechanism when said controller is moved from one circuit controlling position to another for insuring the operation of said relay only during the transition from one position to another.

14. In combination, a plurality of motors, an accelerating controller having a plurality of circuit controlling positions, connections established by movement of said controller in one direction for accelerating said motors in series relation, and connections established by movement of said controller in the other direction for accelerating said motors in parallel relation, pneumatic operating means for selectively operating said accelerating controller in a given direction, timing means for retarding operation of said controller through both directions of movement, stop mechanism for mechanically holding said accelerating controller in any one of said circuit controlling positions, a pair of contacts operated by said stop mechanism as said controller is moved from one circuit controlling position to another, a relay having a winding responsive to motor current for controlling said stop mechanism and another winding, an energizing circuit for said other winding completed by said contacts for energizing said operating coil as said controller moves from one circuit controlling position to another, and means for increasing energization of said other winding to a greater degree during series operation of said motors than during parallel operation of said motors.

15. In combination with an acceleration controller for electric motors, an operating device therefor for causing said controller to advance step by step, stop mechanism for arresting operation of said controller, an acceleration relay, connections for energizing said relay in response to the sum of the current flowing through said motors, and means actuated by said stop mechanism as said controller is advanced from one step to another step rendering said relay more sensitive to the motor current only as said controller moves between said steps.

16. In combination, a plurality of motors, a plurality of accelerating resistors in circuit therewith, switching means for connecting said motors in series or parallel relation, a master controller selectively operable to a plurality of positions for operating said switching means, an accelerating controller for successively short circuiting said resistances, an accelerating relay having a plurality of windings, connections for connecting a winding in each parallel path when said motors are connected in parallel and for connecting said windings in series during series operation of said motors, a calibrating winding for said relay, and means responsive to the operation of said master controller for energizing said calibrating winding during series operation of said motors in greater degree than during parallel operation of said motors.

17. In combination, a plurality of motors, switching means for selectively connecting said motors in series or in parallel circuit relation, an accelerating controller for controlling the acceleration of said motors, an accelerating relay provided with a plurality of windings for controlling the operation of said acceleration controller, connections for connecting one of said windings in series with each branch of the circuit for parallel operation and for connecting said windings in series during series operation of said motors.

18. In a system of motor control, a motor controlling resistance having a plurality of sections, an acceleration controller for controlling said resistance, connections whereby movement of said controller in one direction excludes the sections of resistor connected in series relation with respect to each other, and a return movement of said controller excludes the sections of resistance in multiple connected paths, pneumatic means for operating said controller first in one direction and then in the other direction, a fluid throttling device associated therewith for controlling the speed of operation of said pneumatic means, a stop mechanism for arresting movement of said pneumatic means, an operating coil for said stop mechanism, an accelerating relay provided with a plurality of windings, connections for connecting one of said windings in series circuit with said motor controlling resistance, an energizing circuit for another of said windings, and means for increasing energization of said coil to a greater degree during movement of said controller in one direction than during movement in the other direction.

19. In a motor control system having a plurality of motors arranged to be accelerated in series and in parallel relation, a master controller selectively operable to a plurality of positions, an acceleration controller for controlling the energization of said motors, stopping means therefor provided with an operating coil, an accelerating relay provided with a plurality of windings, connections for connecting one of said windings in each parallel path of said motors when operating in parallel relation and for connecting said windings in series when said motors are connected in series relation, a calibrating winding for said relay, connections established by movement of said master controller to one position for increasing the energization of said calibrating winding while decreasing the energization of said operating coil, and connections established by movement of said master controller to another of its positions for decreasing the energization of said calibrating coil, and means responsive to the operation of said acceleration relay for increasing the energization of said operating coil of said stopping means.

20. In a motor control system, a plurality of motors, a resistance for controlling the acceleration of the motors, an acceleration controller operable between predetermined limits of movement for varying the value of said resistance, a reciprocating fluid pressure operating device for said controller having opposing pistons each for operating said controller in a corresponding direction, means for predetermining the speed of said controller for both directions of operation, an electrically controlled valve mechanism for selectively applying fluid pressure to said pistons, a master controller, switching means responsive to the movement of said master controller to a predetermined position for connecting said motors in series, connections completed by movement of said controller to said predetermined position for operating said valve mechanism so that said operating device causes said accelerating controller gradually to exclude said resistance from the motor circuit, means responsive to the completion of the movement in one direction for deenergizing said valve mechanism, a second switching means for connecting said motors in parallel relation, an energizing circuit for said second switching means completed by operation of said motor controller to a second predetermined position and to said acceleration controller, and means responsive to said second switching means for operating said valve mechanism for the return movement of said acceleration controller.

21. In a motor control system, a plurality of motors, switching means for selectively connecting said motors in series or in parallel relation, a resistance for controlling the acceleration of said motors, an acceleration controller for controlling said resistance, a reciprocating fluid pressure operating device therefor having opposing pistons each for operating said controller in a corresponding direction, means for predetermining the speed of movement of said controller comprising a chamber having an incompressible fluid therein in communication through a restricted orifice with one of said pistons, valve mechanism for selectively admitting fluid pressure either to said chamber or to said other piston to effect the movement of said controller in a corresponding direction at a predetermined speed, and connections completed by movement of said controller in one direction for gradually excluding said resistance from the motor circuit with the motors in series relation and for gradually excluding said resistance from the motor circuit with the motors in parallel relation on the return movement of said controller.

JOHN F. TRITLE.